Feb. 5, 1946. J. T. MULLER 2,394,467
ARTICLE HANDLING APPARATUS
Filed May 11, 1944 3 Sheets-Sheet 1

INVENTOR
J. T. MULLER
BY E.B. Nowlan
ATTORNEY

Feb. 5, 1946.  J. T. MULLER  2,394,467
ARTICLE HANDLING APPARATUS
Filed May 11, 1944  3 Sheets-Sheet 2
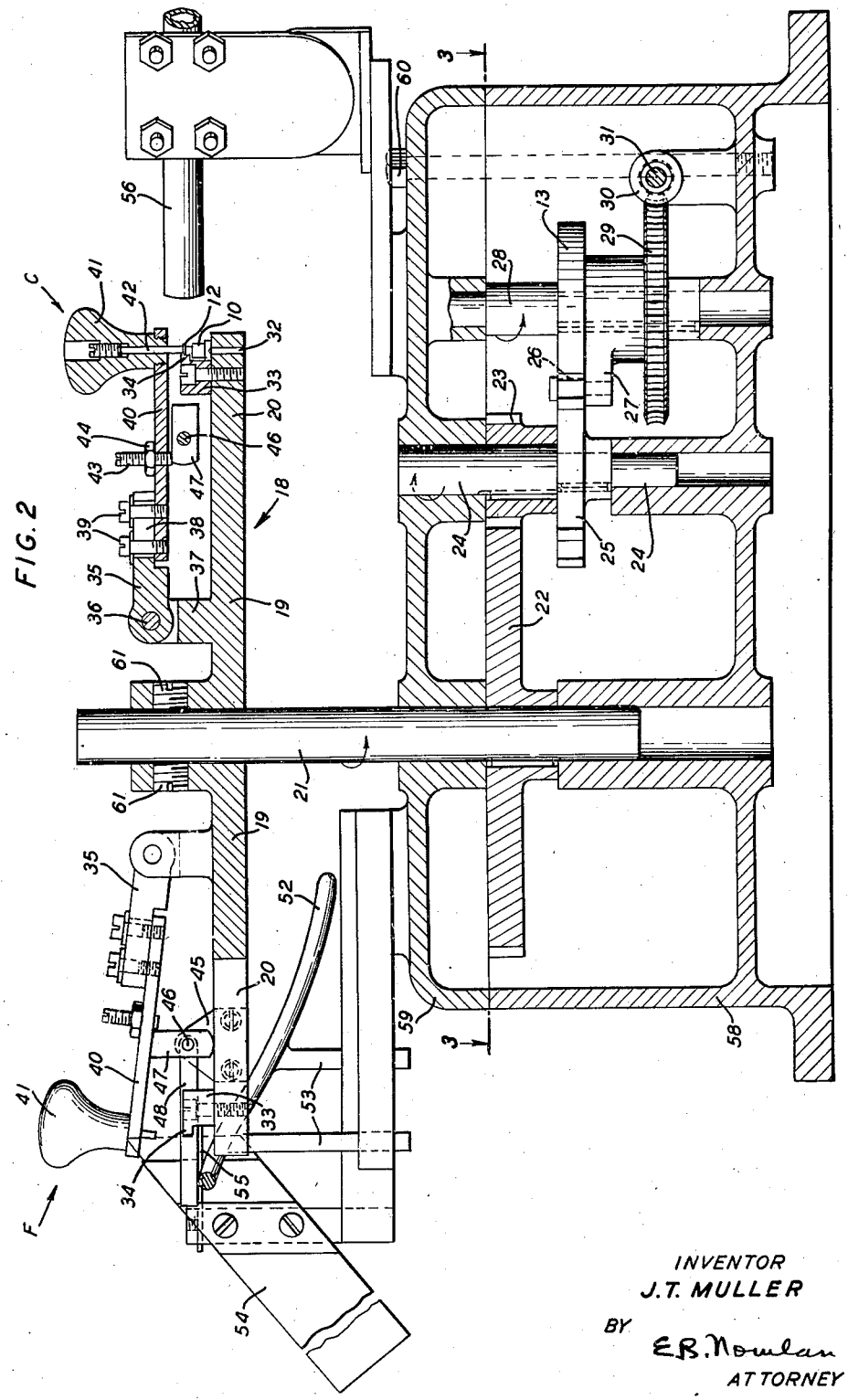
INVENTOR
J. T. MULLER
BY
E.B. Nowlan
ATTORNEY

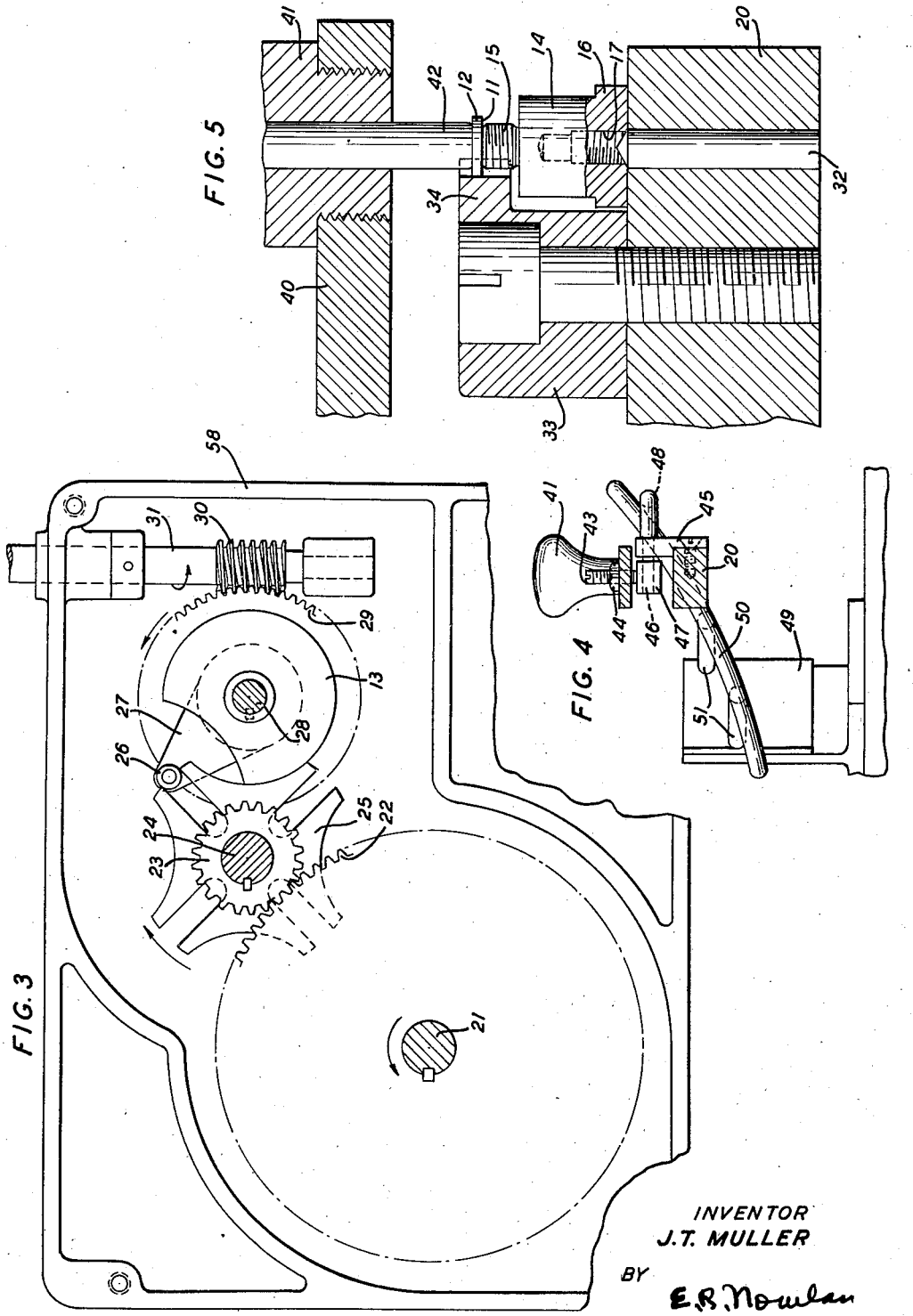

Patented Feb. 5, 1946

2,394,467

UNITED STATES PATENT OFFICE 2,394,467

ARTICLE HANDLING APPARATUS

John T. Muller, Livingston, N. J., assignor to Western Electric Company, Incorporated, New York, N. Y., a corporation of New York Application May 11, 1944, Serial No. 535,174

8 Claims. (Cl. 113—59)

This invention relates to article handling apparatus, and more particularly to apparatus for automatically soldering together two metal faced elements to form an article.

In certain electrical devices and apparatus recently developed an article of importance as a component is a relatively massive copper base having a chequer of micro-crystalline silicon coated on one side thereof with nickel soldered at the nickel coated face on the copper base.

An object of the present invention is to provide a simple, rugged and reliable apparatus primarily adapted for soldering such a metal faced chequer on a metal base member.

With the above and other objects in view, the invention may be embodied in an apparatus for soldering and comprising a movable support, means thereon to locate in accurate relative position two elements to be soldered together with solder therebetween, a lever pivotable in the support into one position to clamp the elements thereon and into another position to release the same, means to press the lever yieldably from the releasing position toward the clamping position thereof, a cam carried on the support to move the lever from the clamping position to the releasing position, a lever on the cam to actuate the same, means to heat the elements to effect the soldering thereof, means to move the support into and out of a position of operative relation of the elements and the heating means, and a stationary cam to shift the cam actuating lever to free the first named lever to move to clamp the elements on the support as the support moves toward its position of operative relation of the elements and the heating means.

Other objects and features of the invention will appear from the following detailed description of one embodiment thereof taken in connection with the accompanying drawings, in which the same reference numerals are applied to identical parts in the several figures and in which Fig. 1 is a plan view of an apparatus constructed in accordance with the invention;

Fig. 2 is a section on the line 2—2 of Fig. 1;

Fig. 3 is a section on the line 3—3 of Fig. 2;

Fig. 4 is a section on the line 4—4 of Fig. 1; and

Fig. 5 is a much enlarged detail of a portion of the showing of Fig. 2.

Figure 1:
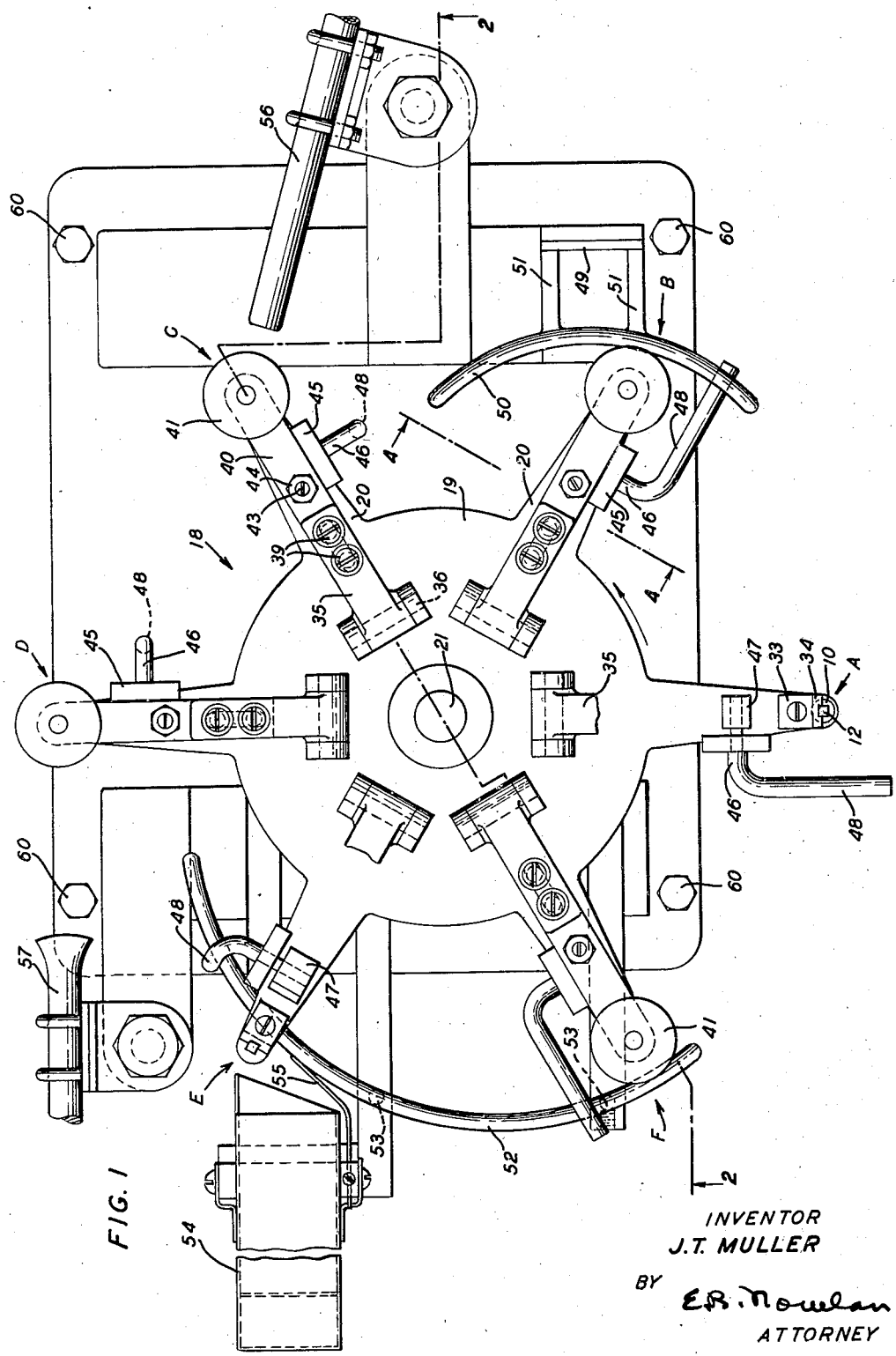

The particular machine selected to be shown and described herein as an illustrative embodiment of the invention is designed and arranged to effect the soldering together of a relatively large and massive base 10 (Figs. 5 and 2) and a chequer 12 of silicon having a coating 11 of nickel on the face to be soldered to the base. The base 10 comprises a cylindrical main body 14, an integral threaded axial stem 15 with a transverse plane end face on which the chequer 12 is to be soldered, and a cylindrical enlargement 16 around the bottom. There is also a threaded axial bore 17 entering the base from the bottom. The chequer 12 is a thin square lamina of micro-crystalline silicon which has been electroplated on one broad face with nickel as indicated at 11 (in Fig. 5 only).

The machine comprises a spider-like turntable generally indicated at 18 having a disk-like body 19 and a plurality (here six) of integral radial arms 20 thereon. The table 18 is rigidly mounted on a vertical shaft 21 to be rotated thereby, this shaft being suitably journalled and supported in an appropriate frame. The shaft 21 is driven by a gear 22 secured thereon, which is driven by a pinion 23 keyed on a shaft 24 journalled in the machine frame. A Geneva motion spider 25 is also keyed to the shaft 24 to be driven by a cam roller 26 mounted on an arm 27 keyed on a shaft 28 which also carries the stop motion member 13 of the Geneva drive. The shaft 28 is driven by a worm gear 29 thereon meshing with a worm 30 on a shaft 31 which is driven clockwise as seen in Fig. 2, by any suitable power means (not shown).

Each of the six radial arms 20 of the turntable 18 bears the same furnishing as any other. The outer end of the arm is flat on top and provided with a vertical positioning pin 32 protruding above the flat top surface and formed to enter the bore 17 of a base 10 to position the same accurately in a predetermined location on the arm 20. A block 33 rigidly secured on the arm 20 beside but spaced from such a base carries an overhanging locating stud 34 positioned and formed to locate a chequer 12 resting on the flat top of the stem 15 of a base 10 in position on the base coaxial with the stem and body of the base. A lever 35 is pivoted at 36 in a pedestal 37 formed on the table body 19, to swing vertically toward and from the top of the arm 20. The lever 35 is formed with a longitudinal vertical slot 38 to receive two clamping screws 39, 39 which serve to hold a lengthening bar 40 rigidly on the lever but adjustable inward and outward along the lever. On the outer end of the bar 40 is rigidly secured a massively heavy, combined handle and clamping weight 41. A clamping pin 42 is mounted to be vertically coaxial in the handle 41 and, when in the position of the parts shown in Fig. 5, to rest coaxially on a chequer 12 resting on a base 10, both positioned by the members 32 and 34. The pin 42 is preferably vertically adjustable in the handle 41 as shown in Fig. 5. About midway of the bar 40 a vertical cam adjusting pin 43 is threadedly mounted in the bar to be vertically adjustable therein and is locked in adjusted position by a jam nut 44. A vertical bracket 45, rigidly mounted on the side of the arm 20 and extending upwardly pivotably supports a short transverse shaft 46 horizontally and transversely above the arm 20. A cam block 47 is rigid on the shaft 46 and rotatable therewith to raise the lever 35 in the position of the cam block shown at the left of Fig. 2, or to allow the lever 35 to come down as shown at the right of the same figure. The shaft 46 extends through the bracket 45 and is bent at right angles to form a lever arm 48 extending at right angles to the cam block 47. A bracket 49 carries a fixed curved cam bar 50 on horizontal arms 51, 51. The bar 50 is so formed and positioned that when one of the spider arms 20 sweeps past, if the lever arm 48 is not vertical, the arm will be pressed down into depending verticality. Another fixed curved cam bar 52 is mounted on legs 53, 53 on the machine frame, and is so located and shaped that when one of the spider arms 20 sweeps past, the depending lever arm 48 on that spider arm is lifted outwardly until horizontal. The cam block 47 is so formed that when the arm 48 is horizontal, as at the left of Fig. 2, the block 47 and arm 48 are held yieldably in position by the bar 40 and weight 41. The adjustable pin 43 is so located and is to be so adjusted that the cam block 47 cannot turn to allow the arm 48 to swing inward, radially of the machine, past its vertical position, as best shown at the right side of Fig. 2.

A receiving chute 54 is supported at the left of the machine frame as shown and is provided with a spring arm 55 to remove completed work from the arms 20 sweeping by. A heat projecting means 56, such as a Bunsen burner or oxyacetylene burner or the like, is also mounted on the machine frame as shown, as well as a nozzle 57 for compressed air.

The Geneva motion drives the spider body 19 and its arm 20 one-sixth of a revolution at each revolution of the Geneva drive arm 27. Any one arm of the spider therefor occupies each of the six positions or stations in turn indicated by A, B, C, D, E and F in Fig. 1. At station A, the lever 48 is horizontally up and hence the cam 47 holds the lever 35 and bar 40 in the position shown at the left of Fig. 1. An attendant places a base member 10 in position on the arm 20, located by entry of the pin 32 into the bore 17 of the base member, lays a flake of solder on the top surface of the stem 15 of the base, and lays a silicon chequer 12, wet with liquid flux, nickel coated side down, on the solder flake, and pushes the lever 48 down, bringing the pin 42 down on the chequer to hold the assembly together under the pressure of the weight 41.

The arm 20 is then stepped along by the drive to the position B. Nothing happens here unless the attendant has forgotten to turn the lever 48 down or is absent when the step along occurs. In such case the cam bar 50 turns the lever down to prevent jamming the machine at some later period by contact of the protruding lever arm with, for example, the burner 56. Whether turned down by the attendant or by the cam bar 50, the turning down of the lever 48 allows the weight 41 to clamp the base 10 and chequer 12 (with the solder flake between) in proper relative position to each other to be soldered together. The turntable advances another step, bringing the parts thus clamped into the flame of the burner 56 at the station C, where they remain for a time interval great enough to melt the solder flake between the base 10 and chequer 12. The speed of the shaft 31 is such that, for the apparatus as disclosed, the stopped period of the table 19 effected by the member 13 between advances of the table is sufficient to allow the burner 56 to effect satisfactory soldering heat of the parts at the station C but not long enough to overheat. The next step along of the table brings the parts to station D, still clamped together, and into the cooling blast from the air nozzle 57. This is sufficient to set the solder completely and finish the operation. As the assembly next advances to the station E, the arm 48 is raised by the cam bar 52 releasing the soldered parts; and while the spider arm 20 advances from the station E to the station F, the finished soldered assembly is swept off the arm 20 by the spring 55 and falls into the chute 54 to be delivered thereby into some receptacle (not shown). The arm 20 resting idly at station F cools further and sufficiently, before advancing to the loading station at A to begin the cycle of operations over again, to allow the attendant to place a new base 10, solder flake, and chequer 12 thereon without danger of being burned.

Given constant speed at the shaft 31 and hence constant alternate periods of rest and motion of the shaft 24 as driven by the Geneva drive 25, 26, 27, 13, the number of rest periods in one revolution of the shaft 21 is dependent only upon the ratio of the teeth in the gears 22 and 23, while the time interval of any rest period is dependent only upon the speed of the shaft 31. The particular apparatus disclosed is designed and proportioned to deal with a particular size of base 10, whose mass is such that the rest period in the air blast at station D and the rest period at station F are sufficient to cool the soldered parts enough to set the solder thoroughly before they are swept off into the chute 54. For a smaller base 10, four positions might be sufficient, while for a larger and more massive base 10, another air blast position and another position of rest in the air of the room might be desirable, making eight positions in all.

It will be noted that the machine frame is made in two sections, a base 58 and a cover 59 separable along the line 3—3 of Fig. 2 and secured together by bolts 60. Also, the table 19 is removably secured on the shaft 21 by screws 61. Hence the turntable as a unit can be easily and simply removed from the shaft to be replaced by another turntable having a larger or smaller number of radial arms 20, each equipped with the furnishings shown. When the turntable is removed, the cover 59 can be lifted vertically off after loosening the bolts 60. The gears 22 and 23 are then free to be lifted off the shafts 21 and 24 to be replaced by another pair of the teeth ratio adapted to provide a number of rest periods in each revolution of the shaft 21 to correspond to the number of arms 20 on the new turntable to be placed on the shaft 21.

It is further to be noted that the cam blocks 47 are all so shaped that, except as actuated manually or by one of the cam bars 50 and 52, the pressure of the bar 40 on the cam block 47 retains the cam block and its lever 48 in either the position illustrated at station A or station D. In any other position the weight of the lever 48 will swing these parts into the position of station D.

What is claimed is:

1. An apparatus for soldering and comprising a movable support, means thereon to locate in accurate relative position two elements to be soldered together with solder therebetween, a lever pivotable on the support into one position to clamp the elements thereon and into another position to release the same, means to press the lever yieldably from the releasing position toward the clamping position thereof, a cam carried on the support to move the lever from the clamping position to the releasing position, a lever on the cam to actuate the same, means to heat the elements to effect the soldering thereof, means to move the support into and out of a position of operative relation of the elements and the heating means, and a stationary cam to shift the came actuating lever to free the first named lever to move to clamp the elements on the support as the support moves toward its position of operative relation of the elements and the heating means.

2. An apparatus for soldering and comprising a movable support, means thereon to locate in accurate relative position two elements to be soldered together with solder therebetween a lever vertically pivotable on the support to move down into one position to clamp the elements thereon and to move up into another position to release the same, a weight to press the lever yieldably from the releasing position toward the clamping position thereof, a cam carried on the support to lift the lever from the clamping position to the releasing position, a lever on the cam to actuate the same, means to heat the elements to effect the soldering thereof, means to move the support into and out of a position of operative relation of the elements and the heating means, and a stationary cam to shift the cam actuating lever to free the first named lever to move down to clamp the elements on the support as the support moves toward its position of operative relation of the elements and the heating means.

3. An apparatus for soldering and comprising a horizontal spider on a rotatable vertical shaft, means on each arm of the spider to locate in accurate relative position two elements to be soldered together with solder therebetween, a lever on each spider arm pivotable vertically thereon into one position to clamp the elements thereon and to move up into another position to release the same, a weight on each lever to press the lever yieldably from the releasing position toward the clamping position thereof, a cam on each spider arm to lift the lever thereon from the clamping position to the releasing position thereof, a lever on each cam to actuate the same, single stationary means to heat the elements to effect the soldering thereof, means to drive the shaft step by step to move the arms of the spider in succession into and out of a position of operative relation of the elements and the heating means, and a single stationary cam to shift the cam actuating levers in turn to free each first named lever to move down to clamp the elements on the support as the arm moves toward its position of operative relation of the elements and the heating means.

4. An apparatus for soldering and comprising a horizontal spider on a rotatable vertical shaft, means on each arm of the spider to locate in accurate relative position two elements to be soldered together with solder therebetween, a lever on each spider arm pivotable vertically thereon into one position to clamp the elements thereon and to move up into another position to release the same, a weight on each lever to press the lever yieldably from the releasing position toward the clamping position thereof, a cam on each spider arm to lift the lever thereon from the clamping position to the releasing position thereof, a lever on each cam to actuate the same, single stationary means to heat the elements to effect the soldering thereof, single stationary means to remove soldered elements from each spider arm in turn, means to drive the shaft step by step to move the arms of the spider in succession into and out of a position of operative relation of the elements and the heating means, a single stationary cam to shift the cam actuating levers in turn to free each first named lever to move down to clamp the elements on the support as the arm moves toward its position of operative relation of the elements and the heating means, and a single stationary cam to shift the cam actuating lever to force the first named lever to move up to release the soldered elements on the arm as the arm moves toward the element removing means.

5. An apparatus for soldering and comprising a horizontal spider on a rotatable vertical shaft, means on each arm of the spider to locate in accurate relative position two elements to be soldered together with solder therebetween, a lever on each spider arm pivotable vertically thereon into one position to clamp the elements thereon and to move up into another position to release the same, a weight on each lever to press the lever yieldably from the releasing position toward the clamping position thereof, a cam on each spider arm to lift the lever thereon from the clamping position to the releasing position thereof, a lever on each cam to actuate the same, single stationary means to heat the elements to effect the soldering thereof, a Geneva motion to drive the shaft step by step to move the arms of the spider in succession into and out of a position of operative relation of the elements and the heating means, and a single stationary cam to shift the cam actuating lever in turn to free each first named lever to move down to clamp the elements on the support as the arm moves toward its position of operative relation of the elements and the heating means.

6. An apparatus for soldering and comprising a horizontal spider on a rotatable vertical shaft, means on each arm of the spider to locate in accurate relative position two elements to be soldered together with solder therebetween, a lever on each spider arm pivotable vertically thereon into one position to clamp the elements thereon and to move up into another position to release the same, a weight on each lever to press the lever yieldably from the releasing position toward the clamping position thereof, a cam on each spider arm to lift the lever thereon from the clamping position to the releasing position thereof, a lever on each cam to actuate the same, single stationary means to heat the elements to effect the soldering thereof, single stationary means to remove soldered elements from each spider arm in turn, a Geneva motion to drive the shaft step by step to move the arms of the spider in succession into and out of a position of operative relation of the elements and the heating means, a single stationary cam to shift the cam actuating levers in turn to free each first named lever to move down to clamp the elements on the support as the arm moves toward its position of operative relation of the elements and the heating means, and a single stationary cam to shift the cam actuating lever to force the first named lever to move up to release the soldered elements on the arm as the arm moves toward the element removing means.

7. An apparatus for soldering and comprising a vertical shaft, a horizontal spider interchangeably mounted on the shaft, means on each arm of the spider to locate in accurate relative position two elements to be soldered together with solder therebetween, a lever on each spider arm pivotable vertically thereon into one position to clamp the elements thereon and to move up into another position to release the same, a weight on each lever to press the lever yieldably from the releasing position toward the clamping position thereof, a cam on each spider arm to lift the lever thereon from the clamping position to the releasing position thereof, a lever on each cam to actuate the same, single stationary means to heat, a gear interchangeably mounted on the shaft, a Geneva motion, a pinion interchangeably mounted on the output shaft of the Geneva motion and meshing with the said gear to drive the first named shaft step by step to move the arms of the spider in succession into and out of a position of operative relation of the elements and the heating means, and a single stationary cam to shift the cam actuating levers in turn to free each first named lever to move down to clamp the elements on the support as the arm moves toward its position of operative relation of the elements and the heating means.

8. An apparatus for soldering and comprising a vertical shaft, a horizontal spider interchangeably mounted on the shaft, means on each arm of the spider to locate in accurate relative position two elements to be soldered together with solder therebetween, a lever on each spider arm pivotable vertically thereon into one position to clamp the elements thereon and to move up into another position to release the same, a weight on each lever to press the lever yieldably from the releasing position toward the clamping position thereof, a cam on each spider arm to lift the lever thereon from the clamping position to the releasing position thereof, a lever on each cam to actuate the same, single stationary means to heat, single stationary means to remove soldered elements from each spider arm in turn, a gear interchangeably mounted on the shaft, a Geneva motion, a pinion interchangeably mounted on the output shaft of the Geneva motion and meshing with the said gear to drive the first named shaft step by step to move the arms of the spider in succession into and out of a position of operative relation of the elements and the heating means, a single stationary cam to shift the cam actuating levers in turn to free each first named lever to move down to clamp the elements on the support as the arm moves toward its position of operative relation of the elements and the heating means, and a single stationary cam to shift the cam actuating lever to force the first named lever to move up to release the soldered elements on the arm as the arm moves toward the element removing means.

JOHN T. MULLER.